United States Patent
Liao

(10) Patent No.: US 9,186,776 B2
(45) Date of Patent: Nov. 17, 2015

(54) POSITIONING BLOCK FOR POSITIONING OBJECT ON WORK BENCH

(71) Applicant: Shu Chi Liao, Taichung (TW)

(72) Inventor: Shu Chi Liao, Taichung (TW)

( * ) Notice: Subject to any disclaimer, the term of this patent is extended or adjusted under 35 U.S.C. 154(b) by 408 days.

(21) Appl. No.: 13/680,079

(22) Filed: Nov. 18, 2012

(65) Prior Publication Data

US 2014/0138894 A1    May 22, 2014

(51) Int. Cl.
*B25B 5/00*     (2006.01)
*B23Q 3/10*     (2006.01)
*B25B 5/10*     (2006.01)

(52) U.S. Cl.
CPC .............. *B25B 5/006* (2013.01); *B25B 5/106* (2013.01); *B25B 5/107* (2013.01); *B23Q 3/103* (2013.01); *B25B 5/109* (2013.01)

(58) Field of Classification Search
CPC ........ B23Q 1/621; B23Q 3/103; B23Q 3/104; B25B 5/109; B25B 5/104; B25B 5/006; B25B 5/106; B25B 5/107

USPC .......... 269/303, 304, 91, 93, 94, 100, 71, 16, 269/155, 88, 136, 73, 309, 95
See application file for complete search history.

(56) References Cited

U.S. PATENT DOCUMENTS 5,056,766 A * 10/1991 Engibarov .................... 269/136
6,715,747 B2 * 4/2004 Nishimura ..................... 269/91

* cited by examiner

*Primary Examiner* — Lee D Wilson
*Assistant Examiner* — Seahee Yoon

(57) ABSTRACT

A positioning block for positioning an object on a work bench includes a body having a positioning hole defined therethrough and a first bolt extends through the positioning hole. A support portion is formed on one side of the body and has a horizontal surface and an upright surface. A flange extends from the body and the board is pressed on the flange. The horizontal surface is parallel to the bottom face of the body. An angle is defined between the horizontal surface and the upright surface.

2 Claims, 10 Drawing Sheets

POSITIONING BLOCK FOR POSITIONING OBJECT ON WORK BENCH

FIELD OF THE INVENTION

The present invention relates to a positioning bock, and more particularly, to a positioning block for positioning object on a work bench.

BACKGROUND OF THE INVENTION

The conventional work bench 1 is disclosed in FIG. 1 and comprises multiple inverted T-shaped grooves 10 and a slide block 18 is inserted and secured in the groove 10 by extending a bolt 15 through the groove 10 and threadedly connected to the threaded hole 180 of the slide block 18.

When positioning an object 2 on the bench 1, the slide block 18 is moved to the position close to the object 2 and a positioning block 25 is put on the bench 1 and located in opposite to the object 2 relative to the groove 10. A board 28 is put across the respective tops of the positioning block 25 and the object 2. The board 28 has a first toothed portion 280 which is engaged with a second toothed portion of the positioning block 25. The bolt 15 extends through the adjustment hole 281 of the board 28 and is threadedly connected to the slide block 18 so that the positioning block 25 and the object 2 are pressed by the board 28. The object 2 is then positioned on the bench 1.

The object 1 may be cut and drilled in sequence, however, the drill can easily touch the top surface of the bench 1 after it drills through the object 2. This makes the top surface to be uneven.

If another object is to be processed, the user has to unscrew the bolt 15 and adjust the slide block 18 and the positioning block 25 so as to position the object. This takes a lot of time and reduces the efficiency.

The present invention intends to provide a positioning block to improve the shortcomings of the conventional positioning block.

SUMMARY OF THE INVENTION

The present invention relates to a positioning block for positioning an object on a work bench and comprises a body having a positioning hole defined therethrough and a first bolt extends through the positioning hole. A support portion is formed on one side of the body and has a horizontal surface and an upright surface. A flange extends from the body and the board is pressed on the flange so as to protect the top surface of the work bench. The horizontal surface is parallel to the bottom face of the body. An angle is defined between the horizontal surface and the upright surface.

The primary object of the present invention is to provide a positioning block for positioning an object on a work bench so as to quickly position and move the objects.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 6:
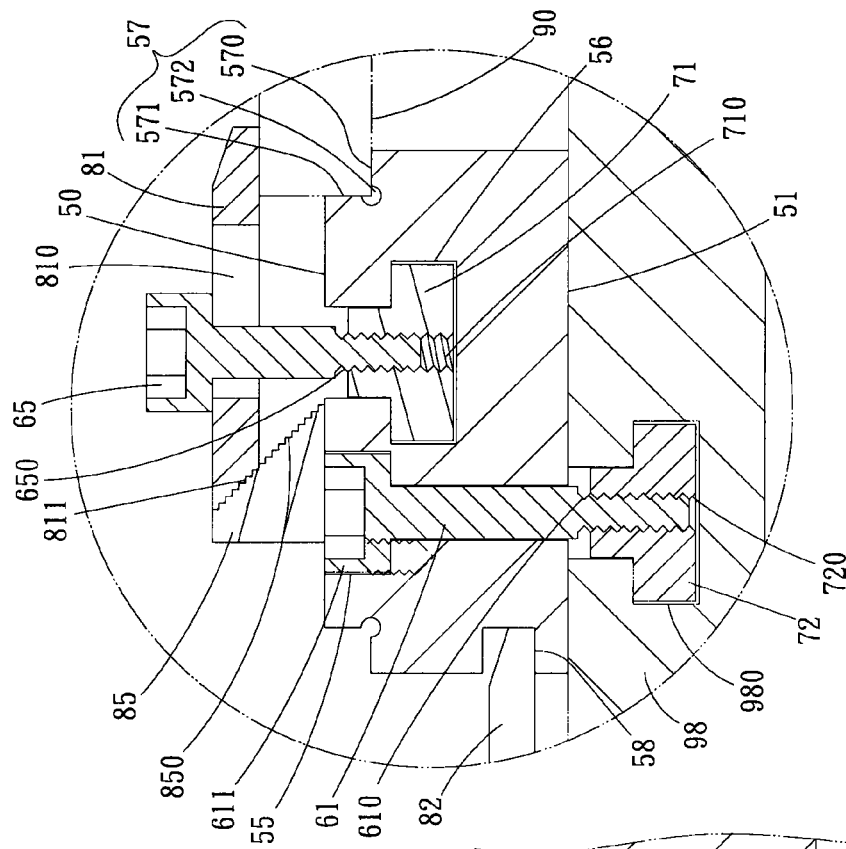
FIG. 6 is a partial cross sectional view to show the positioning block of the present invention in FIG. 5.
Figure 1:
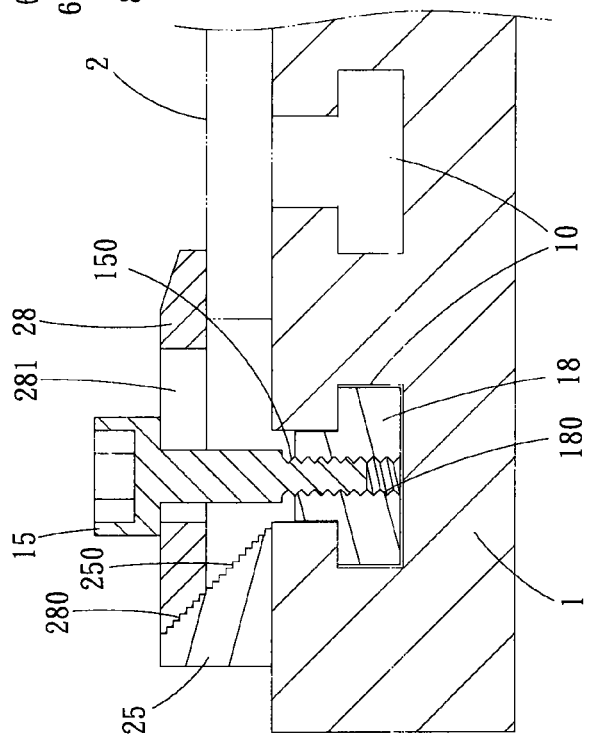
FIG. 1 is a partial cross sectional view of the conventional positioning block on the work bench.
Figure 2:
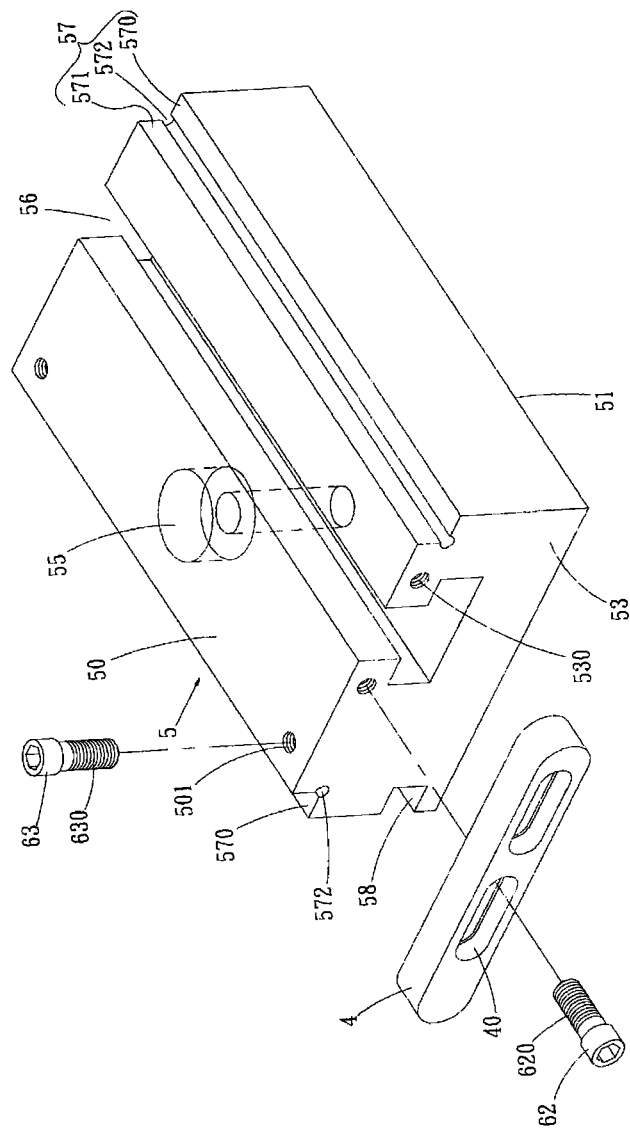
FIG. 2 is an exploded view to show the positioning block of the present invention.
Figure 3:
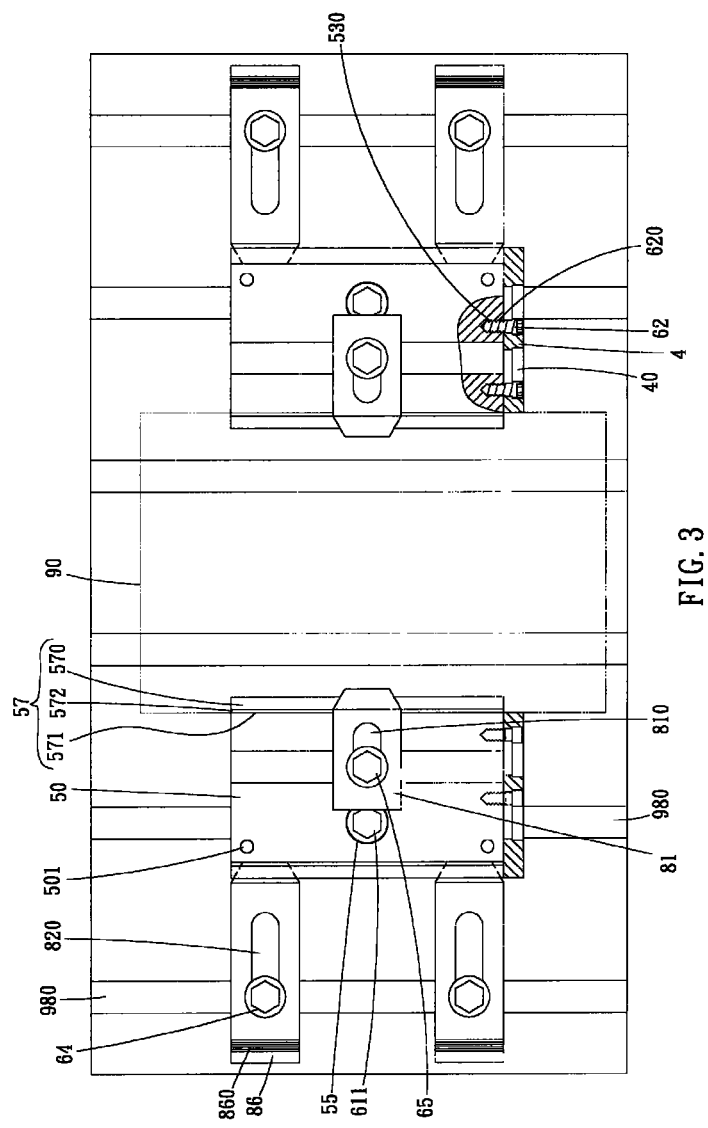
FIG. 3 shows that the object is positioned on the work bench by the positioning block of the present invention.

Referring to FIGS. 2 to 6, the positioning block of the present invention comprises a body 5 having a positioning hole 55 defined therethrough and a first bolt 61 extends through the positioning hole 55. The body 5 further has a positioning slot 56 and a first block 71 is located in the positioning slot 56. A support portion 57 is formed on one side of the body 5 so that the object 90 is supported. A flange 58 extends from the body 5 and located in opposite to the support portion 57, and a first board 81 is put on the flange 58. The positioning hole 55 is a stepped hole to ensure that the head 611 of the first bolt 60 is located within the positioning hole 55 and does not protrude beyond the top face 50 of the body 5. The positioning slot 56 is an inverted T-shaped slot and the support portion 57 is shaped to be slidably engaged with the positioning slot 56. The support portion 57 comprises a horizontal surface 570 and an upright surface 571, wherein the horizontal surface 570 is parallel to the bottom face 51 of the body 5. An angle defined between the horizontal surface 570 and the upright surface 571, preferably, the angle is 90 degrees. A groove 572 is defined in the connection portion between the horizontal surface 570 and the upright surface 571 to ensure that the horizontal surface 570 is perpendicular to the upright surface 571 when being manufactured. A front threaded hole 530 is defined in a front face 53 of the body 5, and a second bolt 62 extends through a stepped hole 40 of the adjustment member 4 and is threadedly connected to the front threaded hole 530 to fix the adjustment member 4 to the front face 53. The adjustment member 4 is movable adjacent to one side of the horizontal surface 570 of the support portion 57, so that objects 90 can be quickly positioned on the horizontal surface 570. The body 5 has a top threaded hole 501 defined in the top face 50 thereof, and a third bolt 63 is threadedly connected to the top threaded hole 501 by the threaded section 630 which extends through the restriction hole of a third board (not shown). Therefore, the third board directly presses on the object 90 from the top face 50. The top face 50 and the bottom face 51 are parallel to each other.

When the object is to be drilled, the body 5 is put on the work bench 98 and the second block 72 is put in the slide groove 980 of the work bench 98, the second block 72 is slid to the position located beneath the stepped positioning hole 55. The threaded hole 720 of the second block 72 is in alignment with the positioning hole 55, the threaded section 610 of the first bolt 61 is threadedly connected to the threaded hole 720 of the second block 72. The body 5 is fixed on the work bench 98 by single point.

In order to position the body 5 on the work bench 98 by multiple points, the second block 73 is put into another slide groove 980 of the work bench 98 until the second block 73 is slid to a position close to the body 5. A second stop block 86 is put on the work bench 98 and is located beside the slide groove 980 in which the third block 73 is already in the groove 980. Two ends of a second board 82 are put on the body 5 and the second stop block 86. The toothed restriction portion 821 of one end of the second board 82 is engaged with the toothed portion 860 of the second stop block 86. The other end of the second stop block 86 is rested on the flange 58. The threaded section 640 of the fourth bolt 64 extends through the restriction hole 820 of the second board 82 and is threadedly connected to the threaded hole (not shown) of the third block 73 to secure the body 5 to the work bench 98 by multiple points.

Figure 5:
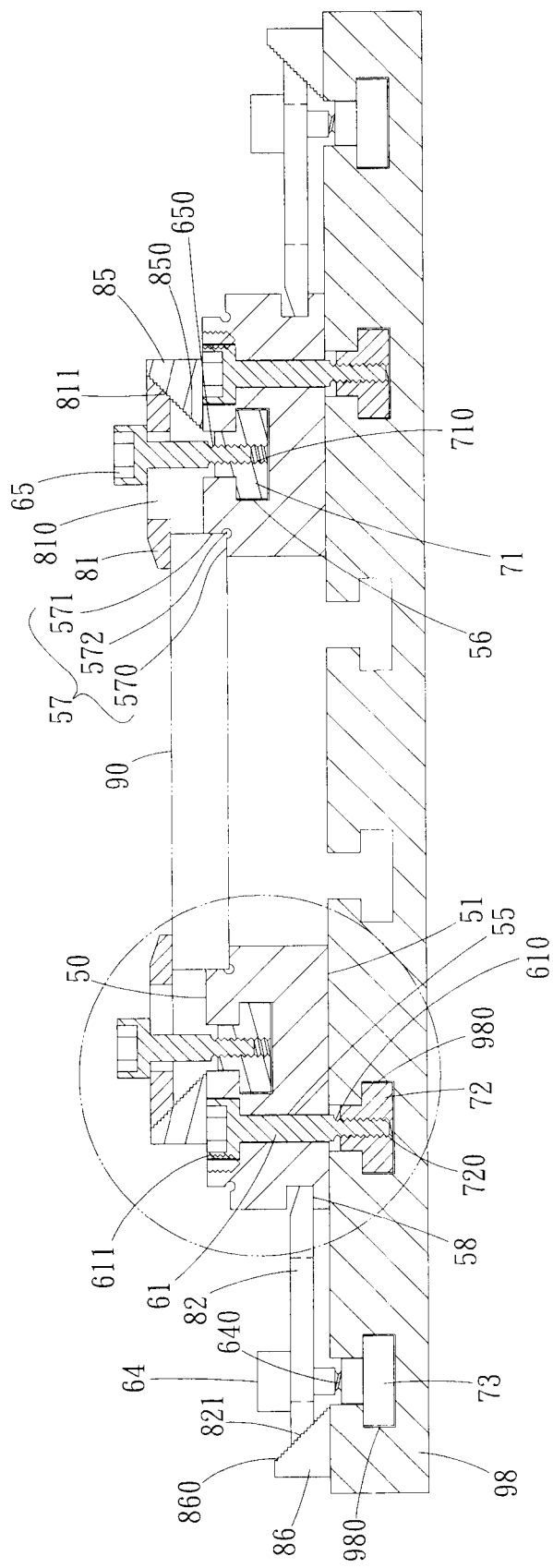
FIG. 5 is a side cross sectional view of the disclosure in FIG. 4.

The two sides of the object 90 are put to be aligned with the horizontal surfaces 570 of the two support portions 57. The first block 71 is slid in the positioning slot 56 and moved to a position close to the object 90. A first stop block 85 is put on the work bench 98 and located beside the positioning slot 56. Two ends of a first board 81 are put on the top of the object 90 and the first stop block 85. The toothed restriction portion 811 of one end of the first board 81 is engaged with the toothed portion 850 of the first stop block 85. The other end of the first stop block 85 is rested on the object 90. The threaded section 650 of the fifth bolt 65 extends through the restriction hole 810 of the first board 81 and is threadedly connected to the threaded hole 710 of the first block 71 to secure the object 90 above the top surface of the body 5 at a distance which prevents the work bench 98 from being drilled by the drill as shown in FIGS. 5 and 6.

Figure 4:
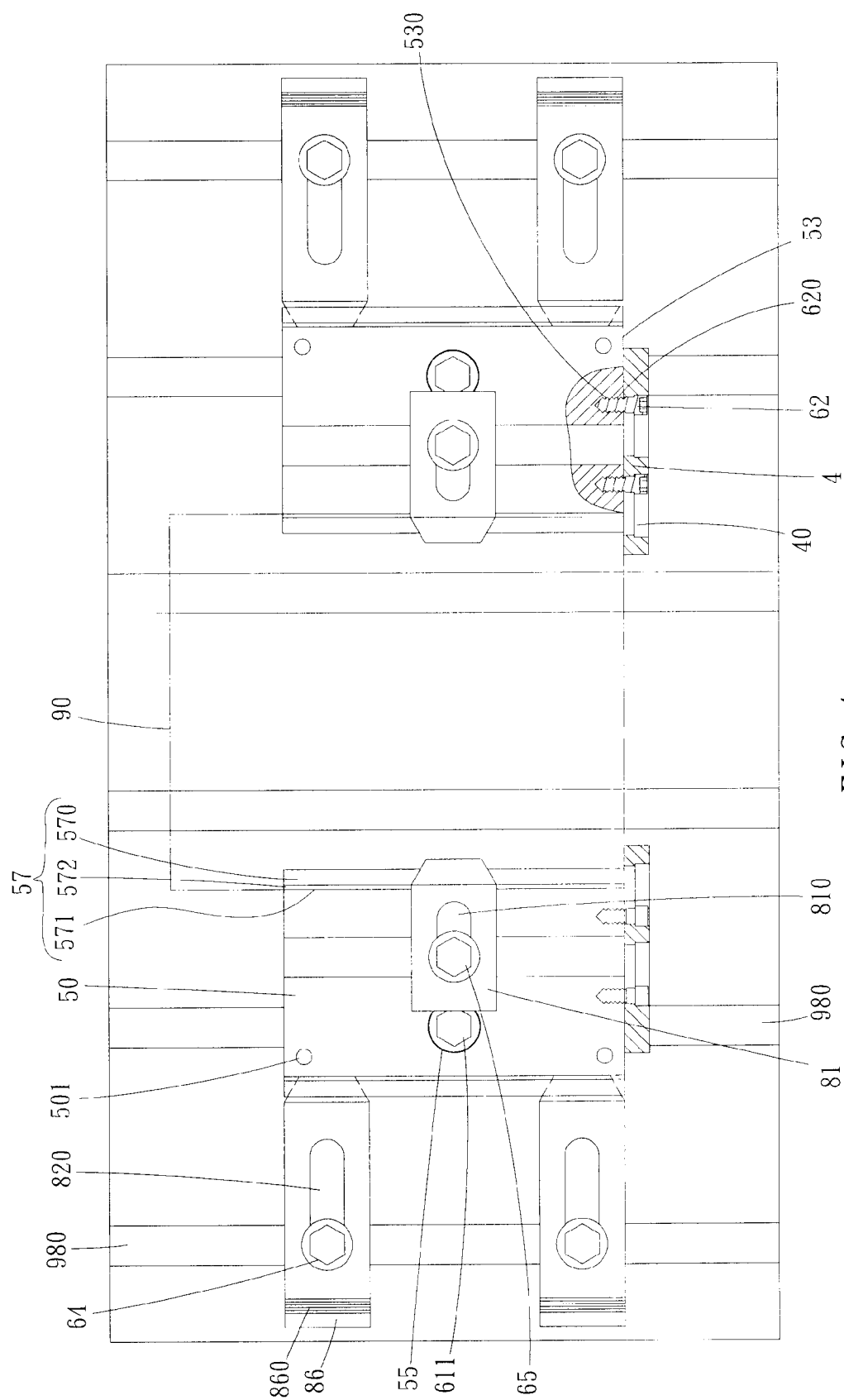
FIG. 4 shows that the positioning block of the present invention is adjusted to position another object.

When another object 90 is to be machined by the similar way, the second bolt 62 is unscrewed and does not press on the adjustment member 4 so that the adjustment member 4 is moved to be located adjacent to the horizontal surface 570 of the support portion 57. The threaded section 620 of the second bolt 62 is then threadedly connected to the front threaded hole 530 to press the adjustment member 4 on the body 5. An end of the adjustment member 4 protrudes beyond the body 5 as shown in FIG. 4 so that the object 90 is slid along the horizontal surface 570 of the support portion 57 until contacts the adjustment member 4. By this way, the object 90 can be quickly positioned.

Figure 7:
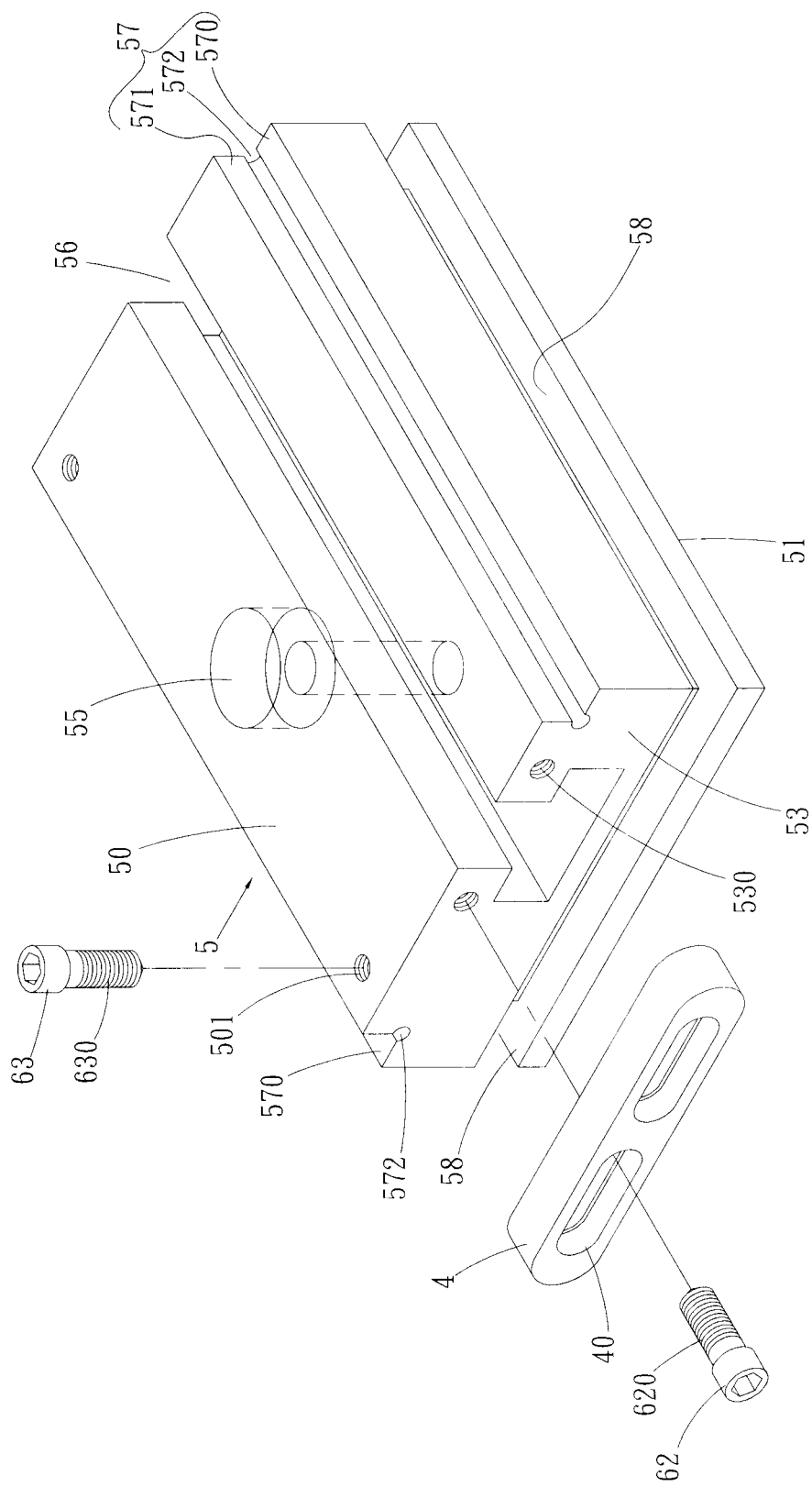
FIG. 7 is an exploded view to show the second embodiment of the positioning block of the present invention.

FIG. 7 shows the second embodiment of the positioning block of the present invention, the difference from the first embodiment is that the flange 58 is located along the four sides of the body 5.

Figure 8:
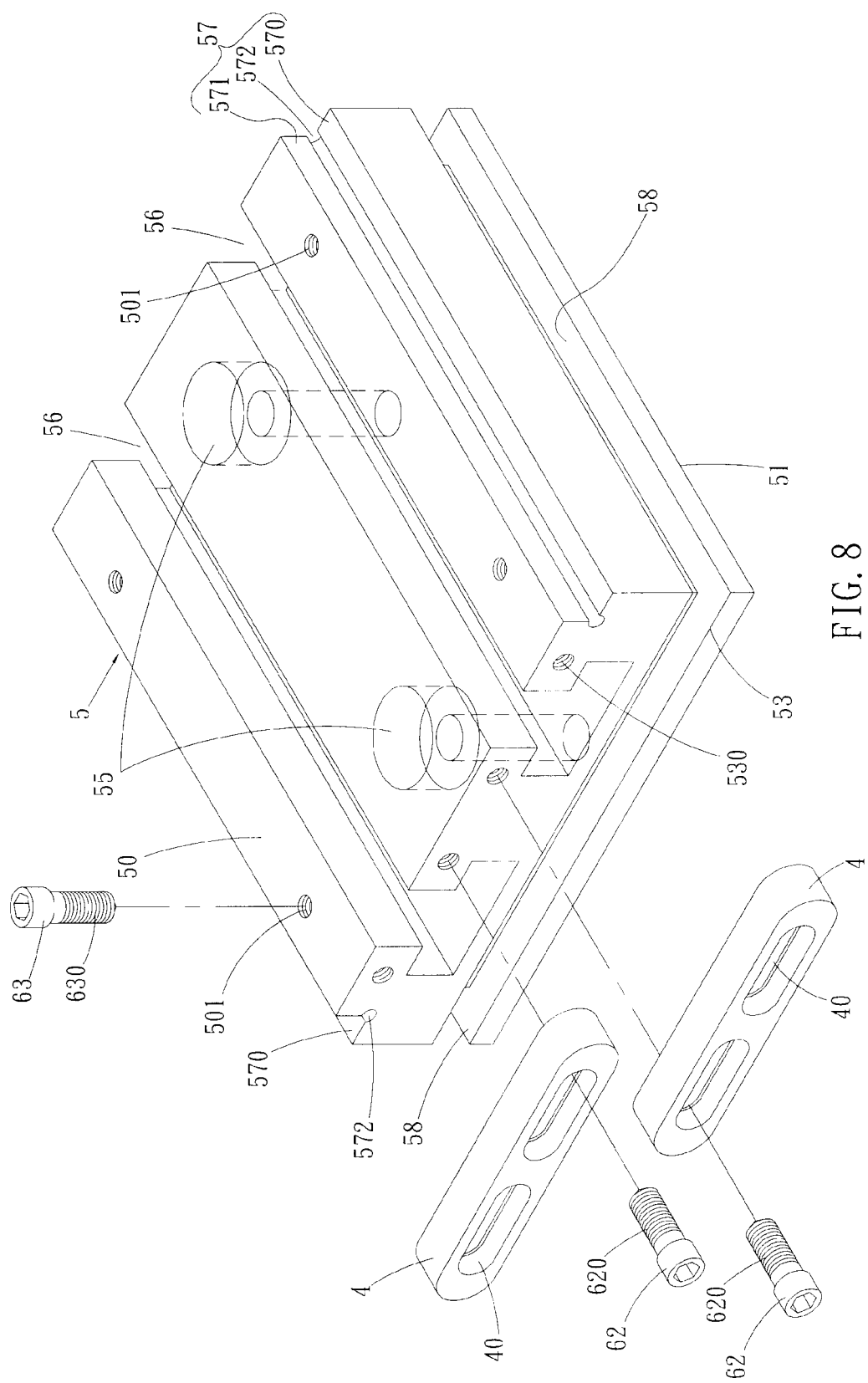
FIG. 8 is an exploded view to show the third embodiment of the positioning block of the present invention.

FIG. 8 shows the third embodiment of the positioning block of the present invention, the difference from the first embodiment is that the flange 58 is located along the four sides of the body 5, and the number of the positioning hole 55 and the positioning slot 56 is changed from one to two.

Figure 9:
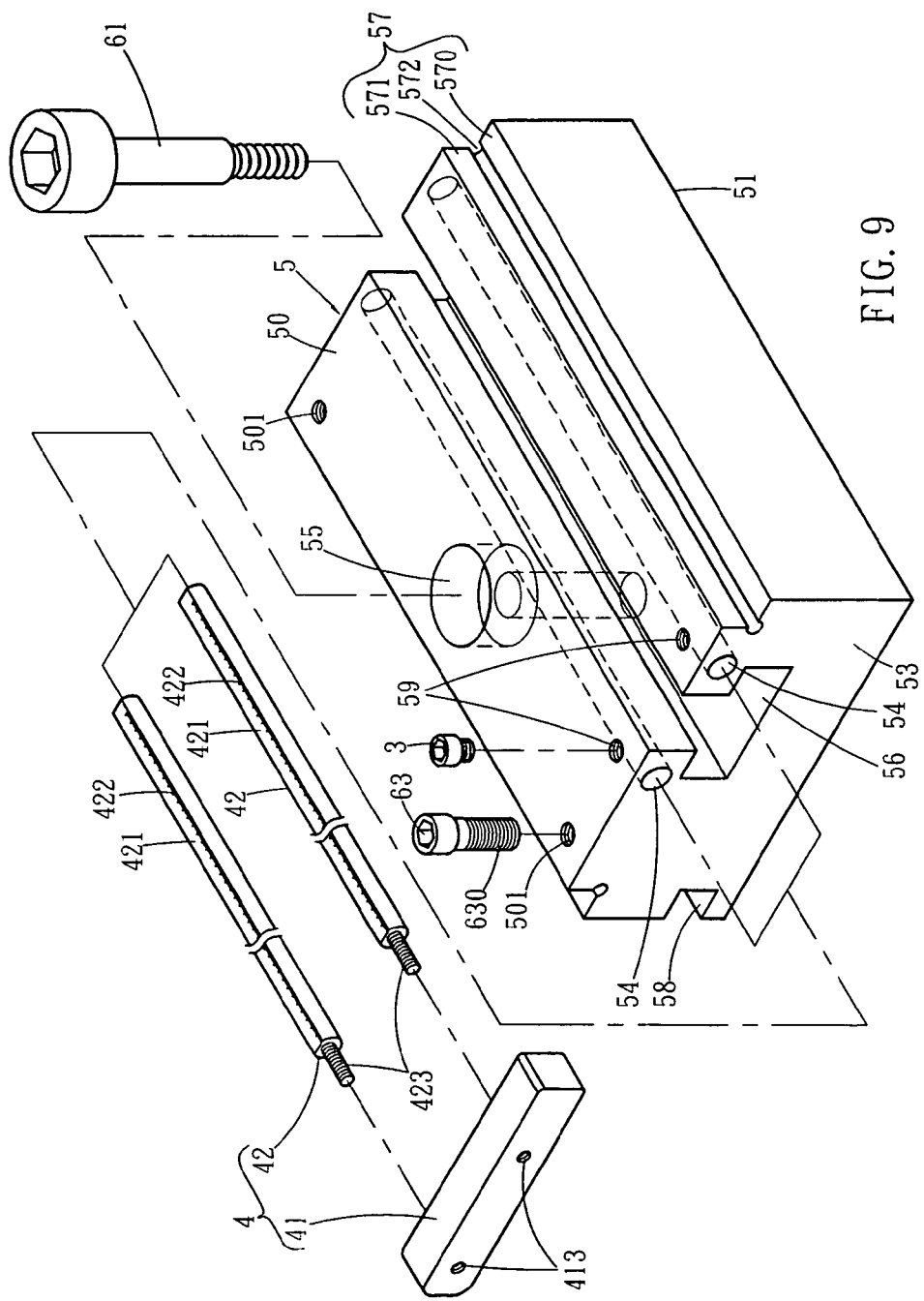
FIG. 9 is an exploded view to show the fourth embodiment of the positioning block of the present invention.

FIG. 9 shows the third embodiment of the positioning block of the present invention, the difference from the first embodiment is that the body 5 has two guide passages 54 defined therein and two threaded holes 59 are defined in the top face 50 of the body 5 and respectively communicate with the guide passages 54. The locking members 3 each are threadedly connected to the threaded hole 59 of the body 5 and reaches an interior of the guide passage 54 so as to contact the surface 421 of the rod 42 of the adjustment member 4 which is then secured and cannot be rotated. Each of the rods 42 is slidably received in the guide passage 54, and the rod 42 extends from the stop 41 which is located at one end of the support portion 57. The surface 421 of the each rod 42 has scales 422 marked thereon so that the movement of the rod 42 can be measured. The rod 42 of the adjustment member 4 and the guide passage 54 are engaged with each other by any of protrusion-and-recess ways. The stop 41 has one side contacts the horizontal surface 570 of the support portion 57 so that the object 90 can be quickly positioned on the horizontal surface 570 of the support portion 57. Each rod 42 has a threaded section 423 extending from one end thereof, the threaded section 423 is threadedly connected to one of the two inner threaded holes 413 of the stop 41 of the adjustment member 4 to connect the rods 42 and the stop 41. The connection between the stop 41 and the rods 42 can be made by any conventional way.

Figure 10:
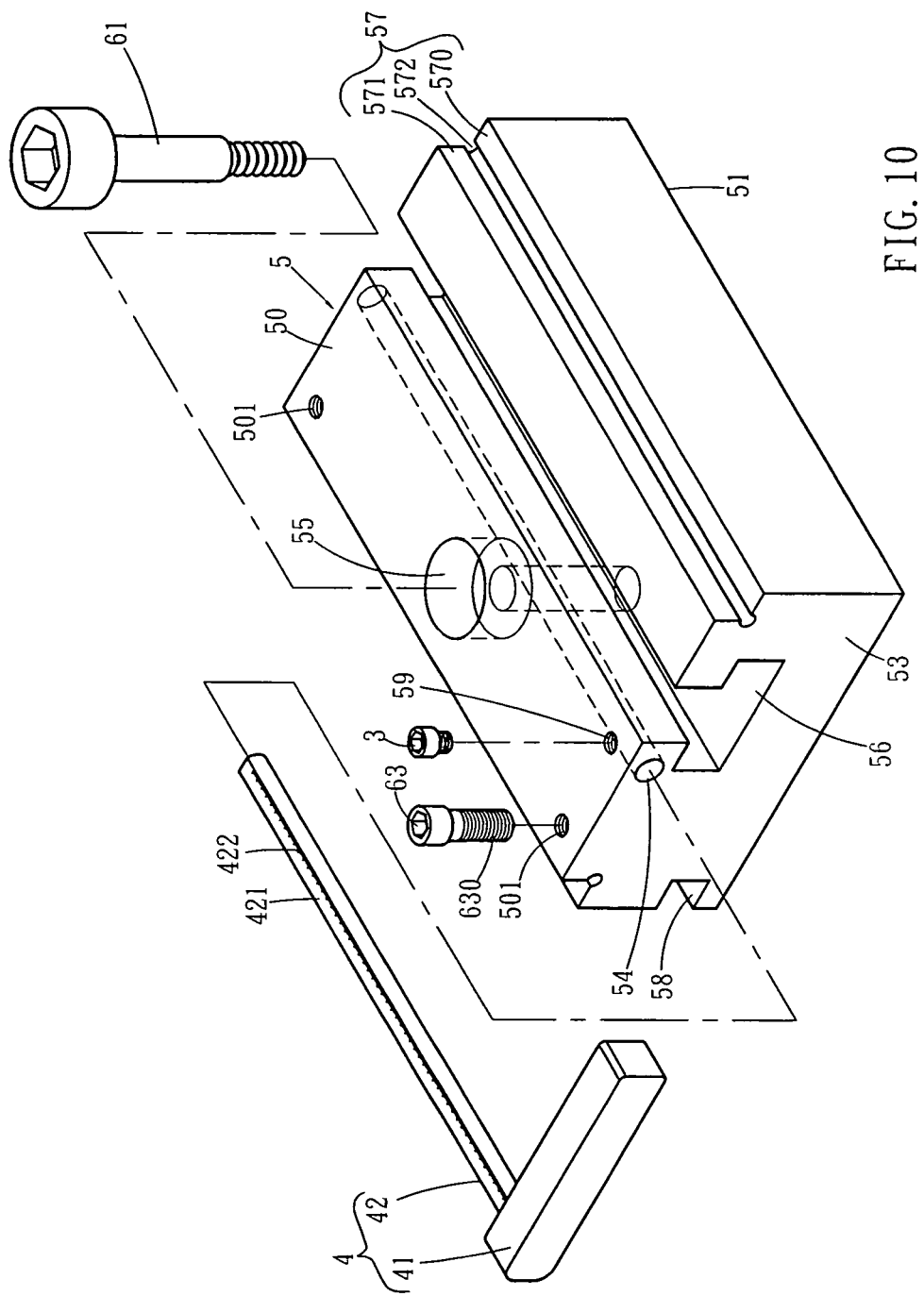
FIG. 10 is an exploded view to show the fifth embodiment of the positioning block of the present invention.

FIG. 10 shows the fifth embodiment of the positioning block of the present invention, the difference from the fourth embodiment is that the number of the guide passage 54 is changed from two to one. The body 5 has a threaded hole 59 which communicates with the guide passage 54. The locking member 3 is threadedly connected to the threaded hole 59 of the body 5 and contacts the surface 421 of the rod 42 of the adjustment member 4 which is then secured and cannot be rotated. The number of the rod 42 is changed from two to one, and the rod 42 is integrally formed with the stop 41. The connection of the rod 42 and the stop 41 forms an L-shaped part or a T-shaped part.

Figure 11:
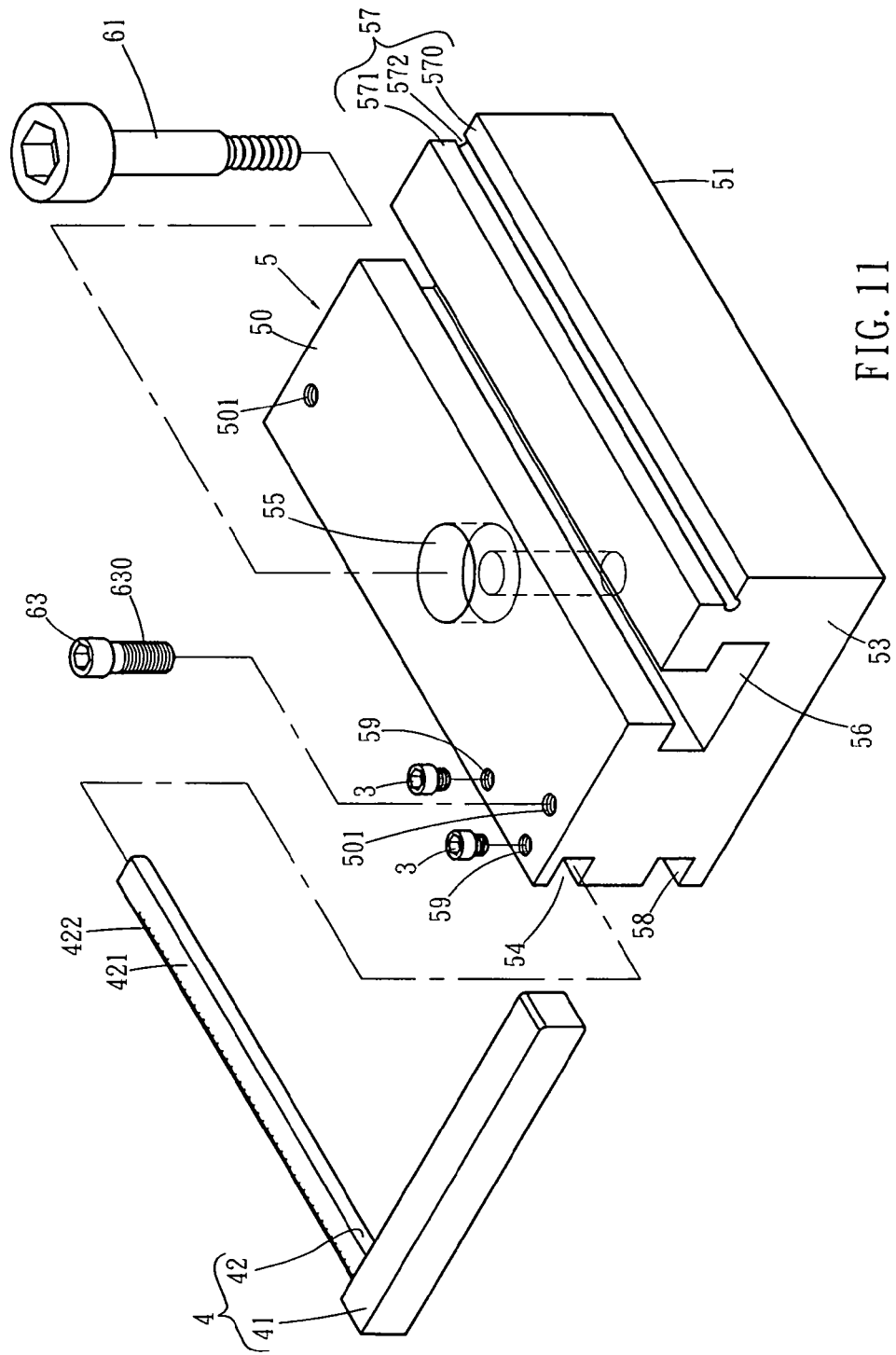
FIG. 11 is an exploded view to show the sixth embodiment of the positioning block of the present invention.

FIG. 11 shows the sixth embodiment of the positioning block of the present invention, the difference from the fifth embodiment is that the number of the guide passage 54 is changed from two to one, and the guide passage 54 is defined in one side of the body 5 so that the guide passage 54 is parallel to the horizontal surface 570. The body 5 has a threaded hole 59 which communicates with the guide passage 54. The locking member 3 is threadedly connected to the threaded hole 59 of the body 5 and contacts the surface 421 of the rod 42 of the adjustment member 4 which is then secured and cannot be rotated. The number of the rod 42 is changed from two to one, and the rod 42 is integrally formed with the stop 41. The connection of the rod 42 and the stop 41 forms an L-shaped part or a T-shaped part.

While we have shown and described the embodiment in accordance with the present invention, it should be clear to those skilled in the art that further embodiments may be made without departing from the scope of the present invention.

What is claimed is:

1. A positioning block comprising:

a body having a positioning hole defined therethrough and a first bolt extending through the positioning hole, a support portion formed on a side of the body and having a horizontal surface and an upright surface, the horizontal surface being parallel to a bottom face of the body, an angle of 90 degrees defined between the horizontal surface and the upright surface, a groove defined in a connection portion between the horizontal surface and the upright surface, the body having a guide passage defined therein and a rod of an adjustment member slidably received in the guide passage, a threaded hole defined in a top face of the body and communicating with the guide passage, a third bolt is threadedly connected to the top threaded hole, the adjustment member having a stop and the rod extending from the stop which is located at one end of the support portion, the rod of the adjustment member having a threaded section extending from an end thereof, the threaded section threadedly connected to an inner threaded hole of the adjustment member to connect the rod and the stop, a locking member threadedly connected to the threaded hole of the body and reaching an interior of the guide passage so as to contact a surface of the rod of the adjustment member and position the rod of the adjustment member, the surface of the rod of the adjustment member having scales marked thereon.

2. The block as claimed in claim 1, wherein the rod of the adjustment member and the guide passage are engaged with each other by way of protrusion-and-recess.

* * * * *